(No Model.) 3 Sheets—Sheet 1.
F. ROCK.
COMBINED DOOR SPRING AND CHECK.
No. 490,886. Patented Jan. 31, 1893.
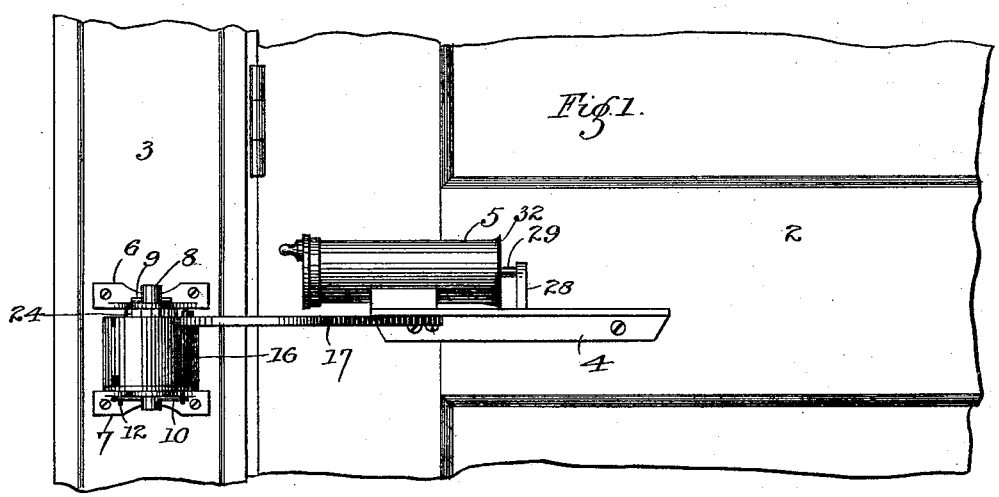
Fig. 1.
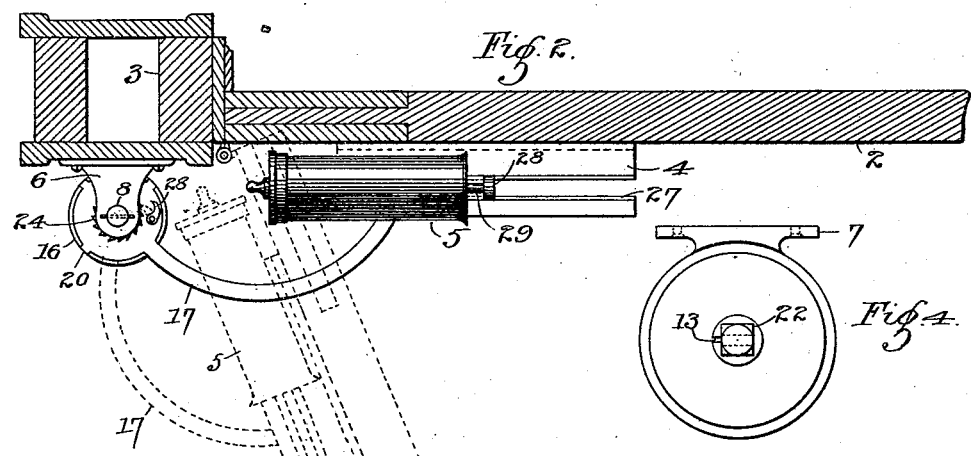
Fig. 2. Fig. 4. Fig. 3.
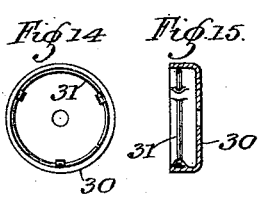
Fig. 14. Fig. 15.
Fig. 5.
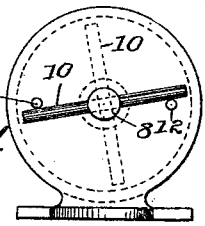
Witnesses:—
C. L. Caldwell
A. M. Nolen
Inventor:—
Ferdinand Rock,
per Paul [illegible]
Attorneys.

(No Model.) 3 Sheets—Sheet 2.
F. ROCK.
COMBINED DOOR SPRING AND CHECK.
No. 490,886. Patented Jan. 31, 1893.
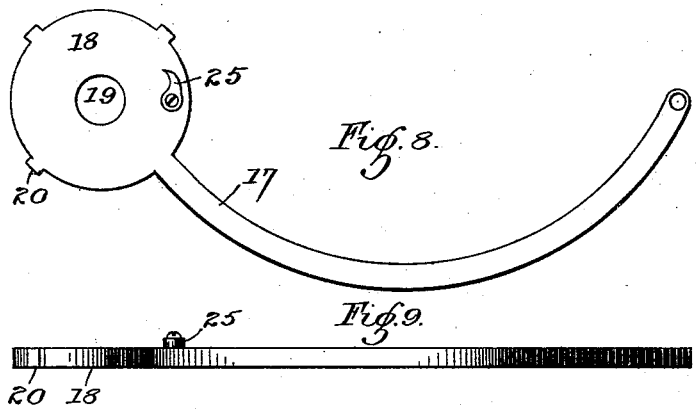
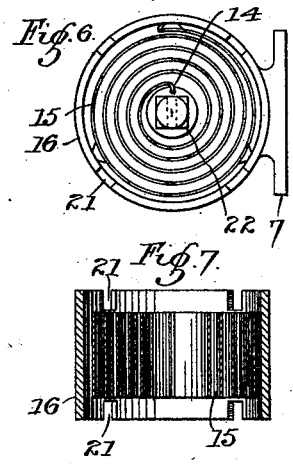
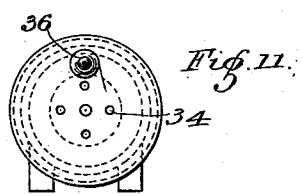
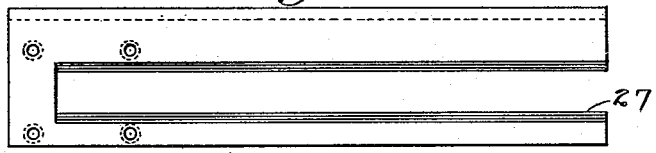
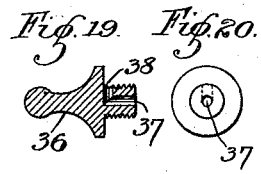
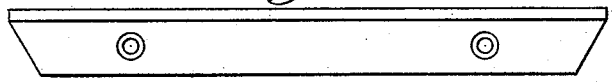
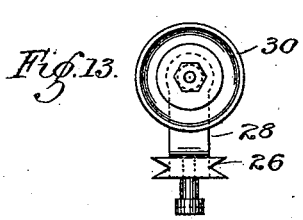
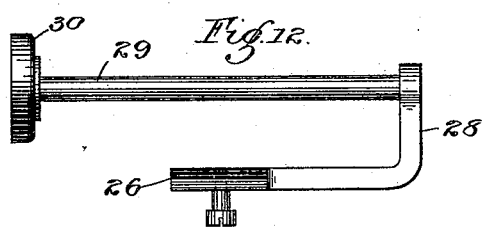
Witnesses:—
C. L. Caldwell.
A. M. Welch.
Inventor:—
Ferdinand Rock,
per Paul Merwin
Attorneys.
THE NORRIS PETERS CO., PHOTO-LITHO., WASHINGTON, D. C.

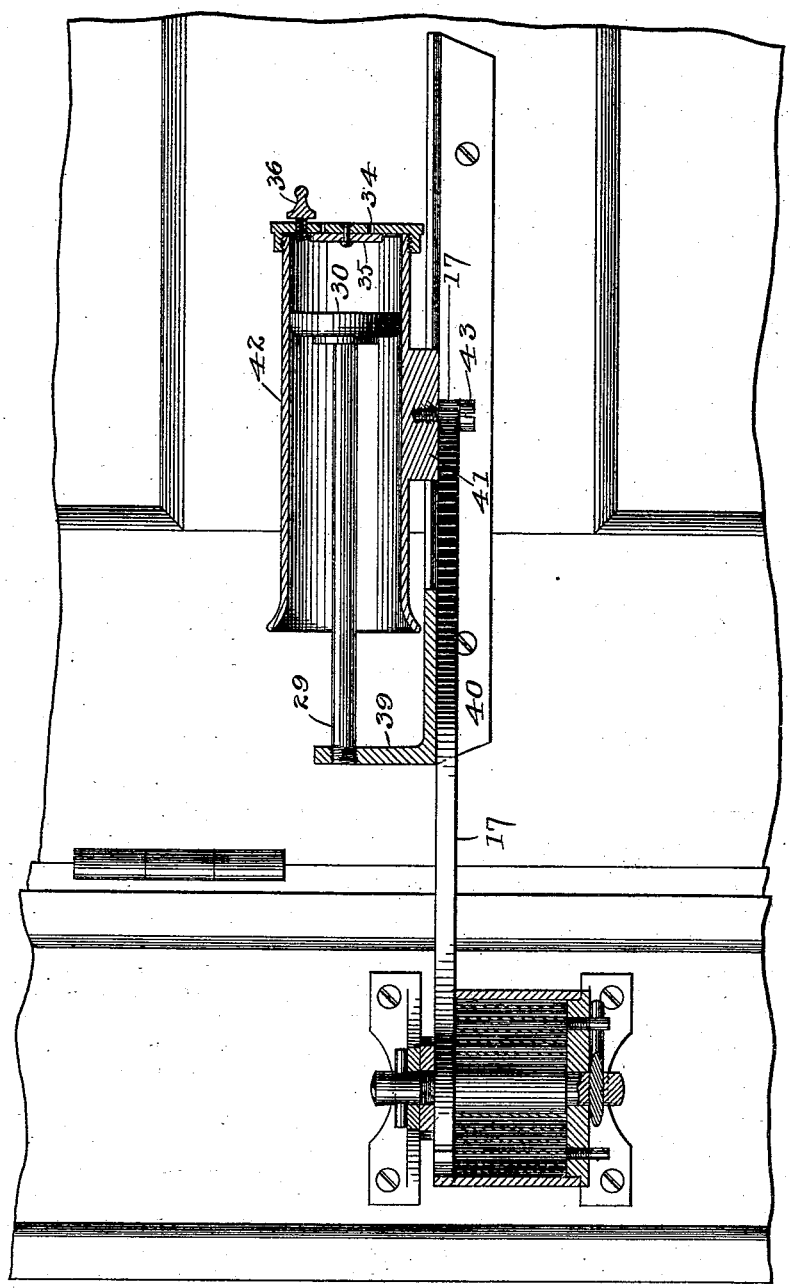

ated an elevation of my improved apparatus shown applied to a door; Fig. 2 is a plan view of the same, the door and the jamb being shown in section, the full lines showing the position of the apparatus with the door closed, and the dotted lines the position with the door partially open. Fig. 3 is a detail side elevation of the pivot on which the arm turns, showing the manner of securing it to its support; Fig. 4 is a plan view of the same; Fig. 5 is a bottom plan view of the pivot support or bracket; Fig. 6 is a detail of the actuating spring shown in position in its case; Fig. 7 is a detail, vertical cross section of the same; Fig. 8 is a plan view of the operating arm; Fig. 9 is a side elevation of the same; Fig. 10 is a detail, longitudinal section of the pneumatic cylinder; Fig. 11 is an end elevation of the same; Fig. 12 is a detail side elevation of the piston and its connections; Fig 13 is an end elevation of the same; Figs. 14 and 15 are details of the piston shown with an annular expanding spring; Figs. 16, 17 and 18 are details of the guide for the operating arm, Figs. 19 and 20 are details of the adjustable vent screw, for the pneumatic cylinder, and Fig. 21 is a section elevation of a modified form of my apparatus.

UNITED STATES PATENT OFFICE.

FERDINAND ROCK, OF ST. PAUL, MINNESOTA, ASSIGNOR OF ONE-HALF TO ANNE MARY CLAUSEN, OF SAME PLACE.

COMBINED DOOR SPRING AND CHECK.

SPECIFICATION forming part of Letters Patent No. 490,886, dated January 31, 1893.

Application filed November 5, 1891. Serial No. 410,954. (No model.)

*To all whom it may concern:*

Be it known that I, FERDINAND ROCK, of St. Paul, Ramsey county, Minnesota, have invented certain Improvements in Automatic Door Springs and Checks, of which the following is a specification.

My invention relates to devices for automatically closing hinged doors, and checking the closing movement just before the door reaches the jam so as to prevent a blow or noise, its object being to provide an apparatus which will efficiently serve these purposes and by means of which also the door can be adjustably fixed in any desired position when open, while yet capable of being turned on its hinges in either direction.

To this end my invention consists in providing a spring controlled arm pivoted to the door jamb on the hinged side of the door, the projecting end of the arm being connected to the face of the door by means of a horizontal guide, a pneumatic cylinder and a piston working therein being provided to check the closing movement of the door, one being carried by the arm and the other being fixed to the door. The actuating spring for this arm is inclosed in a cylindrical case secured to the arm, one end of the spring being connected to the case and the other to the pivot or shaft on which the arm turns. This shaft is provided with a ratchet, with which a pawl or dog carried by the arm is adapted to engage, so as to lock the arm to the shaft and prevent any action of the spring. The shaft is free to turn, when thus locked to the arm, through nearly one complete revolution it being connected to its support upon the jamb, by a linch pin, each end of which strikes against a stud or projection on the support, by which it is prevented from turning under the tension of the actuating spring. When the shaft and arm are thus locked together, the door is free to close and be opened again to the position at which it was set when the shaft and arm were locked, retarded only by the pneumatic pressure in the cylinder, which pressure tends to hold the door in whatever position it may be set.

My invention further consists in the construction and combination hereinafter described and particularly pointed out in the claims.

In the accompanying drawings forming part of this specification Figure 1 is an elevation of my improved apparatus shown applied to a door; Fig. 2 is a plan view of the same, the door and the jamb being shown in section, the full lines showing the position of the apparatus with the door closed, and the dotted lines the position with the door partially open. Fig. 3 is a detail side elevation of the pivot on which the arm turns, showing the manner of securing it to its support; Fig. 4 is a plan view of the same; Fig. 5 is a bottom plan view of the pivot support or bracket; Fig. 6 is a detail of the actuating spring shown in position in its case; Fig. 7 is a detail, vertical cross section of the same; Fig. 8 is a plan view of the operating arm; Fig. 9 is a side elevation of the same; Fig. 10 is a detail, longitudinal section of the pneumatic cylinder; Fig. 11 is an end elevation of the same; Fig. 12 is a detail side elevation of the piston and its connections; Fig 13 is an end elevation of the same; Figs. 14 and 15 are details of the piston shown with an annular expanding spring; Figs. 16, 17 and 18 are details of the guide for the operating arm, Figs. 19 and 20 are details of the adjustable vent screw, for the pneumatic cylinder, and Fig. 21 is a section elevation of a modified form of my apparatus.

In the drawings, 2 represents the door hinged to the jamb 3, in the ordinary manner.

4 is a slotted guide secured horizontally upon the face of the door.

5 is a pneumatic cylinder arranged preferably above and parallel with the guide 4.

6 and 7 are brackets secured to the jamb 3, in which is journaled the pivot or shaft 8 secured in place by means of linch pins 9 and 10. The ends of the pin 10 bear normally against the studs 12 in the bracket 7, as shown in Fig. 5, freedom of rotation for the shaft for nearly one complete revolution in one direction thus being permitted, while it is held by the studs 12 from turning in the opposite direction the shaft being provided with two holes to receive the pin 10 passing through the shaft in the same plane and at right angles with each other. The shaft is provided with the longitudinal groove 13, in which the end 14 of the spiral spring 15 is fitted, the other end of the spring being secured to the inclosing cylindrical case 16, which rests on end upon the bracket 7. The arm 17 is provided with an enlarged, circular, pivot end 18 which fits into one end of the case 16, the end of the shaft 8 passing through the opening 19, and the peripheral spurs 20 fitting into the corresponding notches 21 in the end of the cylinder, whereby the arm is locked to the case. The case is provided with notches 21, in both ends so that its position may when necessary be reversed, thereby furnishing an oppositely acting, or reversible apparatus. The upper end of the shaft 8 is provided with a squared shoulder 22, upon which is fitted the ratchet 24 so as to stand between the arm 17 and the bracket 6. Upon the enlarged end 18 of the arm 17, is pivoted the pawl 25, which may be thrown into engagement with the tooth of the ratchet 24. The outer end of the arm 17 is connected to the grooved block 26, which is fitted to slide in the groove 27 of the guide 4. This block is provided with a right angled arm 28 which carries the piston rod 29, having the piston 30, its position being such that it will work in the cylinder 5. This piston is formed preferably of a cup shaped piece of leather, within the edge or rim of which is fitted an annular spring 31, which tends to keep the edges of the leather expanded to fit closely to the wall of the cylinder. The open end 32 of the cylinder is formed preferably flaring, as shown best in Fig. 10, so as to permit the piston to freely enter it. The closed end 33 is provided with air inlets or ports 34, closed by the flexible disk valve 35 which yields to permit air to enter the cylinder through the ports, but closes against the pressure of the air within the cylinder caused by the inward movement of the piston. Threaded into the closed end 33, is the adjustable vent screw 36, provided with an axial opening or socket 37 and a lateral opening 38 communicating therewith, by the adjustment of the position of which screw in the cylinder, any desired vent can be afforded to the inclosed air.

The operation is as follows: The apparatus being applied to the door and its jamb with the parts connected together as shown in Fig. 1, tension is applied to the actuating spring by opening the door wide, the shaft being held from turning by the linch pin 10 engaging the studs 12. The case and shaft are then locked together by throwing the pawl into engagement with its ratchet, and the door closed, the shaft turning with the case and carrying the linch pin away from the studs 12 into or beyond the position indicated by the dotted lines in Fig. 5. The pin can then be removed from the shaft and inserted in the other hole through the shaft, when the pin will be again in substantially the position relatively to the studs as shown by the full lines in Fig. 5. On again opening the door, the shaft being held from turning by the linch pin engaging the studs, the pawl is thrown out of engagement with the ratchet and additional tension is applied to the spring. The pawl is then thrown again into engagement with the ratchet, and the operation repeated until the requisite tension of the spring for operating the door is secured, when the pawl is finally thrown out of engagement with the ratchet and the apparatus is ready for use. As the door is opened, the piston is drawn outward in the pneumatic cylinder, air entering the cylinder through the ports 34 which are closed by the valve 35 under the pressure of the air, as the door closes carrying the piston inward into the cylinder. The confined air thus serves as a cushion against which the piston strikes and checks the closing movement of the door in the ordinary manner. In order to regulate the outlet of air from the cylinder so that the door will be allowed to close, but prevented from slamming, the vent screw 36 is screwed outward to afford the necessary vent through the lateral opening 38, the action of the pneumatic cylinder being accurately controlled by the position of the screw. When it is desired to relieve the door from the action of the spring, so that it can be set in any desired open position the door is opened to the desired limit, and the pawl thrown into engagement with the ratchet, thus locking the case and shaft together and restraining the resiliency of the spring and all influence of it upon the operating arm, while the door is in this position or any other intermediate between it and the doorway. The door will then stand in the position in which it is left, and can be closed or placed in any intermediate position, the shaft turning in the manner described with the closing movement of the door. The door as thus set in open position will maintain its position against light pressure, because movement in either direction causes movement of the piston in the cylinder, and the pneumatic pressure thus tends to prevent movement of the door. The spring can be instantly released, so as to act normally upon the door, by simply opening the door slightly beyond the position at which it was set whereby the pawl is carried back over the ratchet teeth and thereby thrown out of engagement with them. The door then being released will be closed by the resiliency of the spring as before. The pneumatic cylinder and its piston being arranged with the fixed member between the traveling member and the pivot of the operating arm, the thrust of the piston in its operation tends to crowd the door toward the door jamb, instead of straining it in the opposite direction, as is the case with pneumatic cylinders oppositely arranged, whereby strain or loosening of the hinges of the door is prevented.

In Fig. 21, I show a sectional elevation of a modified construction of my apparatus, with the pneumatic cylinder carried by the operating arm. In this construction the piston rod 29 is connected rigidly to the support 39, which is formed integral with the guide 40. The block 41, formed integral with the cylinder 42, is fitted to the groove of the guide 40, and is secured as by means of a screw 43 to the outer end of the arm 17. The construction of the piston and the cylinder is the same as that above shown, but the cylinder travels along the guide to and from the piston in the operating of the apparatus, instead of the piston being carried in and out of a fixed cylinder.

I claim—

1. In a device of the class described, the combination with the operating arm, of a rotatable pivot therefor, a spring interposed between and acting oppositely upon said pivot and said arm, adjustable means for holding said pivot from rotating under the tension of said spring, and means for locking said pivot to said arm so that it will turn therewith, substantially as described.

2. In a device of the class described, the combination with the operating arm and its support, of a two part pivotal connection between said arm and support, to one of which said arm is fixed, an actuating spring interposed between said parts acting oppositely upon both, and adjustable means for holding the part not connected to the arm against the tension of the spring while allowing it limited movement in the opposite direction and adjustable means for locking said arm to said last named part, substantially as described.

3. The combination with the arm and its support, of a two part pivotal connection between them, one part being fixed to the arm, and both rotatable upon said support, a spring interposed between and operating oppositely upon them, adjustable means for holding the part not connected to the arm against the tension of said spring, and means for interlocking said part and said arm through a predetermined angle of rotation adapted to be automatically disengaged therefrom by the turning of the arm beyond the limited angle, substantially as described.

4. The combination of the arm and its support, the pivot turning in said support, its rotatable case, the inclosed spring engaging both said pivot and case, a fixed connection between the arm and one of the rotatable parts, and a pawl and ratchet attachment by means of which said arm can be locked to the other part through a predetermined angle of rotation, substantially as described.

5. In a device of the class described, the combination with the operating arm, and its rotatable pivot, of the actuating spring connected to said pivot and said arm, means for applying tension to said spring, adjustable means for holding said pivot from rotating under the tension of said spring, and means for locking said pivot and arm together in adjusted positions, substantially as described.

6. In a device of the class described, the combination of the operating arm, its rotatable pivot, the actuating spring engaging said pivot and said arm, means for holding said pivot in adjusted positions against the tension of said spring, and adjustable means for limiting the resiliency of said spring, substantially as described.

7. In a device of the class described, the combination of the operating arm, its rotatable pivot, the coiled spring upon said pivot having its ends in engagement respectively with said pivot and said arm, the pawl and ratchet connection between said arm and pivot, and the stop for holding said pivot in adjusted positions against the tension of said spring, substantially as described.

8. In a device of the class described, the combination of the operating arm, its sliding connection with the door, a pneumatic cylinder for checking its sliding movement on the door, the rotatable pivot for said arm, the coiled spring upon said pivot connected thereto, the inclosing case for said spring connected to it and to said arm, the pawl and ratchet connection between said arm and said pivot, and the stop for holding said pivot in adjusted positions against the tension of said spring, substantially as described.

9. In a device of the class described, the combination with the operating arm, its actuating spring, and the pivot and the spring inclosing case both connected to said spring, and one connected rigidly to the arm and the other having a limited, rotatable movement, of means for applying tension to said spring, and adjustable means for locking said pivot and case together to restrain the resiliency of the spring through a predetermined angle of rotation, substantially as described.

10. In a device of the class described, the combination of the pivoted operating arm, its coiled actuating spring, having one end connected to the arm and the other provided with a rotatable support, adjustable means for holding said support from rotating under the tension of the spring, and adjustable means for locking the support and arm together to restrain the resiliency of the spring, substantially as described.

11. In a device of the class described, the combination with the pivoted lever having an actuated spring, of a horizontal guide upon the door engaging the end of the lever, a pneumatic cylinder in alignment with said guide and a piston carried by said lever and working in said cylinder, substantially as and for the purposes set forth.

In testimony whereof I have hereunto set my hand this 16th day of October, 1891.

FERDINAND ROCK.

In presence of—
T. D. MERWIN,
A. M. WELCH.